US012315480B2

(12) United States Patent
Smith et al.

(10) Patent No.: US 12,315,480 B2
(45) Date of Patent: May 27, 2025

(54) SYSTEM FOR IDENTIFICATION OF A NOTE PLAYED BY A MUSICAL INSTRUMENT

(71) Applicant: AUDIO INVENTIONS LIMITED, Farnborough (GB)

(72) Inventors: Brian Smith, Farnborough (GB); Paul Davey, Farnborough (GB)

(73) Assignee: AUDIO INVENTIONS LIMITED, Farnborough (GB)

( * ) Notice: Subject to any disclaimer, the term of this patent is extended or adjusted under 35 U.S.C. 154(b) by 529 days.

(21) Appl. No.: 17/767,350

(22) PCT Filed: Oct. 9, 2020

(86) PCT No.: PCT/GB2020/052517
§ 371 (c)(1),
(2) Date: Apr. 7, 2022

(87) PCT Pub. No.: WO2021/069916
PCT Pub. Date: Apr. 15, 2021

(65) Prior Publication Data
US 2022/0366883 A1 Nov. 17, 2022

(30) Foreign Application Priority Data
Oct. 9, 2019 (GB) ...................................... 1914588

(51) Int. Cl.
*G10H 1/14* (2006.01)
*G10D 9/00* (2020.01)
(Continued)

(52) U.S. Cl.
CPC ................. *G10H 1/14* (2013.01); *G10D 9/00* (2013.01); *G10H 1/0008* (2013.01);
(Continued)

(58) Field of Classification Search
CPC ...... G10H 1/14; G10H 1/0008; G10H 1/0083; G10H 3/14; G10H 2220/461; G10H 2240/281; G10D 9/00; H01Q 19/10
(Continued)

(56) References Cited

U.S. PATENT DOCUMENTS 2,138,500 A * 11/1938 Miessner ................. G10H 3/16
84/383 A
3,224,006 A * 12/1965 Hogg ..................... H01Q 19/10
343/837
(Continued)

FOREIGN PATENT DOCUMENTS

CA 2693861 9/2010
CN 1405751 A * 3/2003
(Continued)

OTHER PUBLICATIONS

International Preliminary Report on Patentability issued in App. No. PCT/EP2022/069147, dated Dec. 14, 2023, 14 pages.
(Continued)

*Primary Examiner* — Christina M Schreiber
(74) *Attorney, Agent, or Firm* — FisherBroyles, LLP; Jason P. Mueller

(57) ABSTRACT

A system and method is disclosed for identification of a musical note played by a musical wind instrument with a resonant chamber having a plurality of configurations selectable by a player of the musical wind instrument and an electrically conductive surface in the resonant chamber. The system and method include a stimulation signal generator for generating a stimulation signal and antenna means mountable on the musical instrument for broadcasting the stimulation signal as an electromagnetic signal within the resonant chamber and for receiving a reflected electromagnetic signal from the resonant chamber The system and method also include an electronic processing unit for pro-
(Continued)

cessing the reflected electromagnetic signal and determining therefrom a configuration of the resonant chamber selected by the player and indicative of a musical note that is or would be output by the instrument when played at the time of the received reflected signal.

15 Claims, 5 Drawing Sheets

(51) Int. Cl.
*G10H 1/00* (2006.01)
*G10H 3/14* (2006.01)
*H01Q 19/10* (2006.01)

(52) U.S. Cl.
CPC ............ *G10H 1/0083* (2013.01); *G10H 3/14* (2013.01); *H01Q 19/10* (2013.01); *G10H 2220/461* (2013.01); *G10H 2240/281* (2013.01)

(58) Field of Classification Search
USPC ........................................................... 84/609
See application file for complete search history.

(56) References Cited

U.S. PATENT DOCUMENTS

| | | | | |
|---|---|---|---|---|
| 3,429,976 | A * | 2/1969 | Tomcik | G10H 3/143 84/DIG. 24 |
| 3,558,795 | A * | 1/1971 | Barcus | G10H 3/16 84/730 |
| 3,571,480 | A * | 3/1971 | Tichenor | G10H 3/24 84/723 |
| 3,611,391 | A * | 10/1971 | Bartlett | H01Q 19/193 343/781 R |
| 4,038,895 | A * | 8/1977 | Clement | G10H 5/002 84/699 |
| 4,233,877 | A * | 11/1980 | Okami | G10D 7/02 84/453 |
| 4,815,353 | A * | 3/1989 | Christian | G10H 3/181 984/368 |
| 5,131,310 | A * | 7/1992 | Kunimoto | G10H 5/007 84/630 |
| 5,140,888 | A * | 8/1992 | Ito | G10H 1/32 84/723 |
| 5,142,961 | A * | 9/1992 | Paroutaud | G10H 3/00 84/645 |
| 5,149,904 | A * | 9/1992 | Kamiya | G10H 1/02 84/723 |
| 5,189,240 | A * | 2/1993 | Kawashima | G10H 1/0553 84/738 |
| 5,189,249 | A * | 2/1993 | Burkhardt | C06B 47/14 102/292 |
| 5,245,130 | A * | 9/1993 | Wheaton | G10H 1/0066 84/742 |
| 5,668,340 | A * | 9/1997 | Hashizume | G10D 9/01 84/723 |
| 5,929,361 | A * | 7/1999 | Tanaka | G10H 1/055 84/742 |
| 6,542,857 | B1 * | 4/2003 | Holzrichter | G06V 40/10 704/270 |
| 7,220,903 | B1 * | 5/2007 | Bronen | G10D 9/02 84/383 R |
| 7,777,118 | B2 * | 8/2010 | Stoneback | G10H 1/0091 84/622 |
| 7,777,119 | B2 * | 8/2010 | Stoneback | G10H 5/14 84/622 |
| 9,417,217 | B2 * | 8/2016 | Nikolovski | G06F 3/0436 |
| 10,170,091 | B1 * | 1/2019 | Tabata | G10H 1/0551 |
| 10,229,663 | B2 * | 3/2019 | Smith | G10H 3/16 |
| 10,347,222 | B2 * | 7/2019 | Sasaki | G10H 5/005 |
| 10,475,431 | B2 * | 11/2019 | Smith | G10H 3/16 |
| 10,777,180 | B2 * | 9/2020 | Smith | G10H 3/16 |
| 10,832,645 | B2 * | 11/2020 | Davey | G10H 3/125 |
| 11,200,872 | B2 * | 12/2021 | Davey | G10D 7/026 |
| 2003/0149553 | A1 * | 8/2003 | Holzrichter | G01H 9/00 703/2 |
| 2005/0259837 | A1 * | 11/2005 | Kinoshita | G10H 3/14 381/163 |
| 2006/0027074 | A1 * | 2/2006 | Masuda | G10G 7/02 84/454 |
| 2007/0017344 | A1 * | 1/2007 | Stoneback | G10H 5/14 84/600 |
| 2007/0017345 | A1 * | 1/2007 | Stoneback | G10H 5/14 84/600 |
| 2007/0068372 | A1 * | 3/2007 | Masuda | G10H 3/125 84/723 |
| 2007/0144336 | A1 * | 6/2007 | Fujii | G10H 3/24 84/723 |
| 2007/0234887 | A1 * | 10/2007 | Sawada | G10D 9/04 84/723 |
| 2009/0038463 | A1 * | 2/2009 | Fujii | G10D 9/03 84/398 |
| 2009/0223353 | A1 * | 9/2009 | Loftus | G10H 3/18 84/726 |
| 2012/0230155 | A1 * | 9/2012 | Kawaguchi | H03H 3/02 29/25.35 |
| 2013/0014631 | A1 * | 1/2013 | Grace | G10D 9/01 84/454 |
| 2013/0201066 | A1 * | 8/2013 | Parsche | H01Q 19/10 343/743 |
| 2014/0224100 | A1 * | 8/2014 | Vassilev | G10H 5/007 84/723 |
| 2014/0256218 | A1 * | 9/2014 | Kasdas | G10D 99/00 446/416 |
| 2015/0101477 | A1 * | 4/2015 | Park | G10H 3/26 84/633 |
| 2018/0090120 | A1 * | 3/2018 | Kasuga | G10H 1/043 |
| 2018/0137848 | A1 * | 5/2018 | Souvestre | G10H 3/22 |
| 2018/0218720 | A1 * | 8/2018 | Smith | G10H 3/26 |
| 2018/0268791 | A1 * | 9/2018 | Okuda | G10H 1/344 |
| 2019/0020112 | A1 * | 1/2019 | Luo | H01Q 19/19 |
| 2019/0156808 | A1 * | 5/2019 | Smith | G10H 3/125 |
| 2020/0005752 | A1 | 1/2020 | Davey | |
| 2021/0116523 | A1 * | 4/2021 | Yatsuo | G01R 33/3621 |
| 2021/0201871 | A1 * | 7/2021 | Sato | G10H 3/16 |
| 2021/0287640 | A1 * | 9/2021 | Gilmore | H05B 47/105 |
| 2022/0366883 | A1 * | 11/2022 | Smith | G10H 3/26 |
| 2024/0321240 | A1 * | 9/2024 | Smith | G10H 1/348 |

FOREIGN PATENT DOCUMENTS

| | | | | |
|---|---|---|---|---|
| CN | 1828719 | | 9/2006 | |
| CN | 1991972 | A | 7/2007 | |
| CN | 101042857 | A | 9/2007 | |
| CN | 101046950 | A | 10/2007 | |
| CN | 101241697 | A | 8/2008 | |
| CN | 101770767 | | 7/2010 | |
| CN | 104810012 | A | 7/2015 | |
| CN | 212967074 | | 4/2021 | |
| DE | 3120835 | A1 | 12/1982 | |
| DE | 3839230 | A1 | 5/1990 | |
| DE | 102008013484 | | 9/2009 | |
| EP | 1585107 | A2 | 10/2005 | |
| EP | 1760690 | A2 * | 3/2007 | G10H 1/0008 |
| EP | 1804236 | A1 | 7/2007 | |
| EP | 2410513 | A1 | 1/2012 | |
| EP | 2650870 | A1 | 10/2013 | |
| EP | 3326169 | | 5/2018 | |
| FR | 2775823 | A1 | 9/1999 | |
| GB | 1513036 | | 6/1978 | |
| GB | 2537104 | A | 10/2016 | |
| GB | 2540760 | A | 2/2017 | |
| GB | 2559135 | A | 8/2018 | |
| GB | 2559144 | A | 8/2018 | |
| GB | 2585102 | | 12/2020 | |
| GB | 2585102 | B | 6/2021 | |
| JP | S642099 | A | 1/1989 | |
| JP | H0320793 | A | 1/1991 | |

(56) References Cited

FOREIGN PATENT DOCUMENTS

| | | | |
|---|---|---|---|
| JP | H03219293 | A | 9/1991 |
| JP | H03219295 | A | 9/1991 |
| JP | 2002078556 | | 3/2002 |
| JP | 2002278556 | A | 9/2002 |
| JP | 2005122099 | A | 5/2005 |
| JP | 2007065197 | A | 3/2007 |
| JP | 2008076838 | A | 4/2008 |
| JP | 2010204664 | A | 9/2010 |
| JP | 2011154151 | A | 8/2011 |
| JP | 2013164542 | A | 8/2013 |
| JP | 2014232153 | A | 12/2014 |
| TW | 442771 | B | 6/2001 |
| WO | 2018013801 | | 1/2018 |
| WO | 2018138501 | | 8/2018 |
| WO | 2018138504 | A1 | 8/2018 |
| WO | 2018138591 | | 8/2018 |
| WO | 2019073674 | A1 | 4/2019 |

OTHER PUBLICATIONS

Gibiat et al., "Acoustical Impedance Measurements by the Two-Microphone-Three-Calibration (TMTC) Method", The Journal of the Acoustical Society of America, American Institute of Physics for The Acoustical Society of America, New York, NY, US, vol. 88, No. 6, Dec. 1990, pp. 2533-2545.

* cited by examiner

SYSTEM FOR IDENTIFICATION OF A NOTE PLAYED BY A MUSICAL INSTRUMENT

CROSS-REFERENCE TO RELATED APPLICATIONS

This application is a national stage entry application under 35 U.S.C. 371 of PCT Patent Application No. PCT/GB2020/052517, filed 9 Oct. 2020, which claims priority to GB Patent Application No. 1914588.7 filed 9 Oct. 2019, the entire contents of each of which are incorporated herein by reference.

FIELD

The present disclosure relates to a system for identification of a note played by a musical instrument.

BACKGROUND

Note identification by acoustic identification in reed woodwind instruments has already been described in GB 1513036. However, the larger instruments in this reed woodwind family pose a particular challenge for note identification because their lower acoustic wavelengths require stimulation of the instruments at lower frequencies and longer analysis frames.

A further technical problem in note identification using speakers to input stimulus signals to musical instruments and microphones to receive the stimulus signals modified by the transfer functions of the musical instruments is that the note identification method is not immune to acoustic interference. This can mean that such methods are not available for performance purposes.

SUMMARY

The present disclosure provides a system and method for identification of a note played by a musical instrument.

The disclosure uses a transmitted electromagnetic signal to determine a configuration of a resonant chamber in the musical instrument from a sensed reflected wave. The configuration of the resonant chamber may include one or more of a state of openings of the resonant chamber, a state of valve positions of the resonant chamber, a length of the resonant chamber, or some other property of the resonant chamber that influences the musical note selected to be played by a player of the musical instrument.

The system and method of the disclosure can provide for instruments with an electrically conductive surface a real-time system for musical note identification with complete immunity to acoustic interference. Instruments with an electrically conductive surface include the following instruments: saxophones, labrasones (brass instruments), edge-blown aerophones (flutes) and metal clarinets. Additionally, it is feasible to coat the inside surface of traditionally wooden instruments to provide a conductive surface which would allow use of the disclosure. Ideally the instrument would have metal key caps, but the disturbance caused by a player's fingers covering holes could prove sufficient to make a measurable difference to the reflected signal. The disclosure can be used with instruments with a wide variety of internal bore profiles including conical bore profiles (saxophone family) and cylindrical bore profiles (the edge-blown aerophone (e.g. flute) and labrasone (e.g. brass instruments) families).

BRIEF DESCRIPTION OF THE SEVERAL VIEWS OF THE DRAWINGS

Embodiments of the present disclosure will now be described with reference to the accompanying drawings, in which.

DETAILED DESCRIPTION OF THE DICSLOSURE

Figure 1:
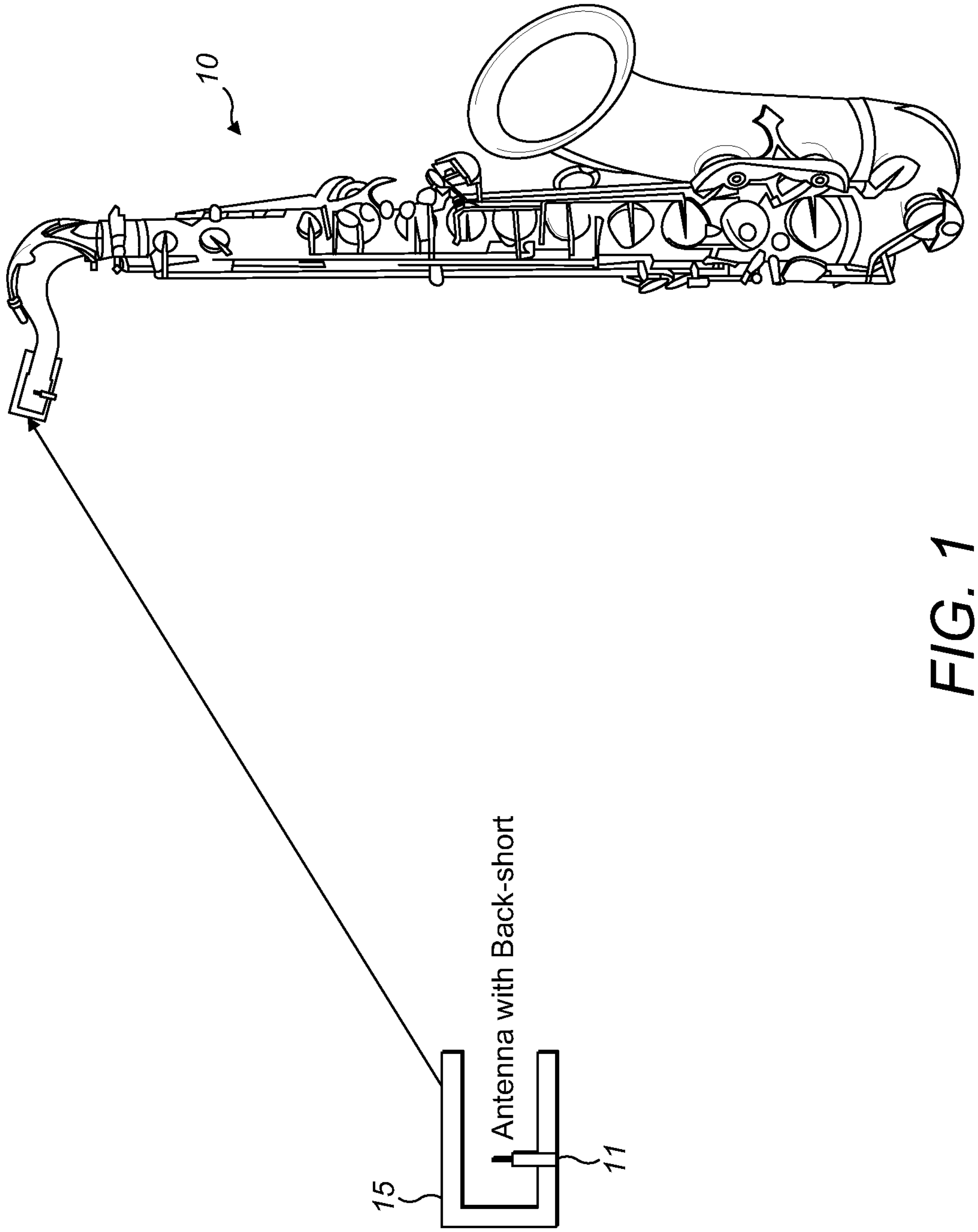
FIG. 1 is an illustration of a saxophone provided with a simple probe wave guide antenna of a system according to the present disclosure.

The current disclosure makes use of signals in the electromagnetic spectrum and recognises that for higher (radio) frequencies within this spectrum the wave nature of an alternating current must be taken into account.

The disclosure treats a metal-bodied (i.e. electrically conducting) instrument, e.g. a tenor saxophone 10 (see FIGS. 1 and 2) as a leaky waveguide, i.e. a waveguide with holes which can be closed by metal (i.e. electrically conducting) keypads. It is known that wave guides may be designed to confine and direct the electromagnetic radio frequency wave with minimal loss.

The system of the disclosure includes an antenna 11 which by transmitting radio waves allows a resonant chamber of the musical instrument 10 to form an electromagnetic resonant cavity at electromagnetic wavelengths which are similar to the normally played acoustic wavelengths.

The saxophone family of instruments have conical bores with relatively small (in comparison with other musical instruments) initial dimensions. For instance, the entrance bore into the crook of a tenor saxophone is about 15 mm in diameter. The lowest 'cut-off' frequency for a circular waveguide to sustain a TE01 wave is defined:

The wavelength in the circular waveguide is given as, $$\lambda_g = \frac{2\pi}{\beta_{nm}} = \frac{2\pi}{\sqrt{\omega^2\mu\varepsilon - h_{nm}^2}} = \frac{\lambda_0}{\sqrt{1-\frac{f_c^2}{f^2}}} = \frac{\lambda_0}{\sqrt{1-\frac{\lambda^2}{\lambda_c^2}}}$$

where $\lambda_0 = \frac{2\pi}{\omega\sqrt{\mu\varepsilon}} = \frac{2\pi}{\beta_0}$ is the wavelength of the uniform plane wave in the lossless dielectric medium inside the guide.

Thus for mode TE01, the cut-off frequency is 11.72 GHz (although it should be mentioned that since the bore of a saxophone is conical, this figure will not be a precisely accurate figure). However, it will suffice for the present disclosure, which recognises that it is necessary to be above the cut-off frequency in order to sustain the wave in the waveguide. The TE01 (transverse electric) mode signifies that all electric fields are transverse to the direction of propagation and that no longitudinal electric field is present.

The implementations described below and supported by FIGS. 3, 4 and 5 operate at an excitation frequency of 13 GHz. The disclosure is not limited to use of such a frequency. Other frequencies may be suitable and appropriate as long as they facilitate sustaining of the wave in the waveguide. For example, using an excitation frequency of 24 GHz may be appropriate. Such a frequency is in one of the ISM radio bands, so called because these are portions of the radio spectrum reserved internationally for industrial, scientific and medical (ISM) purposes other than telecommunications. Other frequencies, both within and without the ISM radio bands, may also be appropriate.

Furthermore, it may be that excitation electromagnetic radiation may be polarised. For example, the antenna may generate a circularly polarised electromagnetic signal. Alternative, the antenna may generate a linearly polarised electromagnetic signal. Alternative, the antenna may generate an unpolarised electromagnetic signal.

The antenna 11 of the present disclosure may be a single probe antenna with a shorted back-stop provided to broadcast a radio frequency electromagnetic signal in a resonant chamber of the instrument 10, as shown in FIG. 1. The antenna may act as both transmitter and receiver. The antenna 11 may be mounted in an end cap 15 which is mountable on the instrument 10 in place of a mouthpiece of the instrument. The end cap 15 has a closed end to seal a mouthpiece end of the instrument. The end cap is metallic, so as to be electrically connected to the metallic musical instrument or to a metallic surface of the musical instrument. For instance, if the instrument is a brass instrument, the end cap 15 could be brass as well. The conductive part of the antenna 11 is mounted in an insulator to be electrically isolated from the end cap 15.

Alternatively, multiple probe antennae may be used, typically being arranged equally around a plane orthogonal to the bore which provides the resonant chamber of the instrument. This could be conveniently be realised as a microstrip circuit with 4 orthogonal probes (or any number of orthogonal probes spaced around the resonant chamber, equally spaced in terms of angle of separation, when viewed in a plane perpendicular to a longitudinal axis of the resonant chamber). It is important to make a good ohmic connection between the shorted back-stop body and the instrument, if necessary connecting to the internal surface of the bore of the instrument with a sprung connection.

Figure 2:
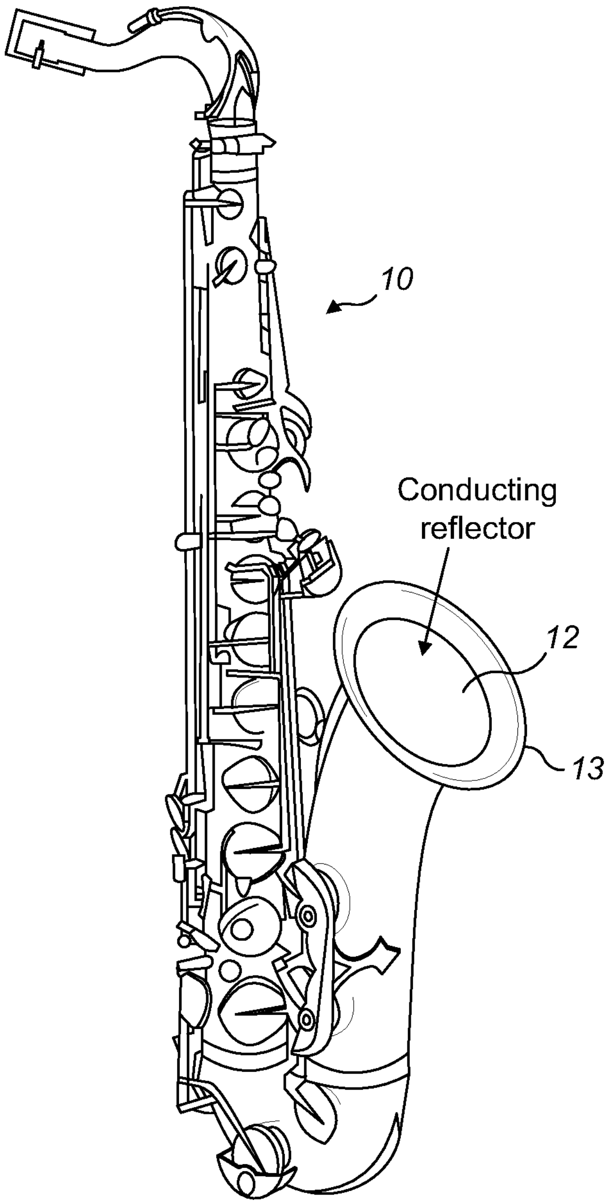
FIG. 2 in an illustration of the saxophone of FIG. 1 with a conducting plane reflector of a system according to the present disclosure, with the reflector fitted to a bell of the instrument for improved electromagnetic reflection.

Saxophones have conical bores opening out very considerably from the initial approximate 15 mm radius (tenor saxophone) to approximately 140 mm at the bell. The sustainable wavelength is directly proportionate to the bore radius. As with an acoustic wave, an element of the radio frequency wave will be reflected at the impedance discontinuity of the opening of the bell into free-air. The reflected energy can advantageously be increased by attaching a conducting plane reflector 12 over a bell end 13 of the instrument 10, as shown in FIG. 2.

The system of the disclosure depends upon stimulating the bore of the instrument with an accurately repeatable range of frequencies and monitoring the reflected energy. The stimulated frequencies may be continuously scanned or individually stepped such that the reflected wave is measured with repeatable frequencies. Measuring the reflected energy across a range of frequencies will produce a 'frame' of data, with a data point per frequency of interest. A programmable network analyser (e.g. the Keysight 5225B™ analyser) can carry out a scan of 1600 points in a few milliseconds (ms). Practical realisations used by the system of the present disclosure generate a sufficient few hundred points in 10 ms.

Figure 3:
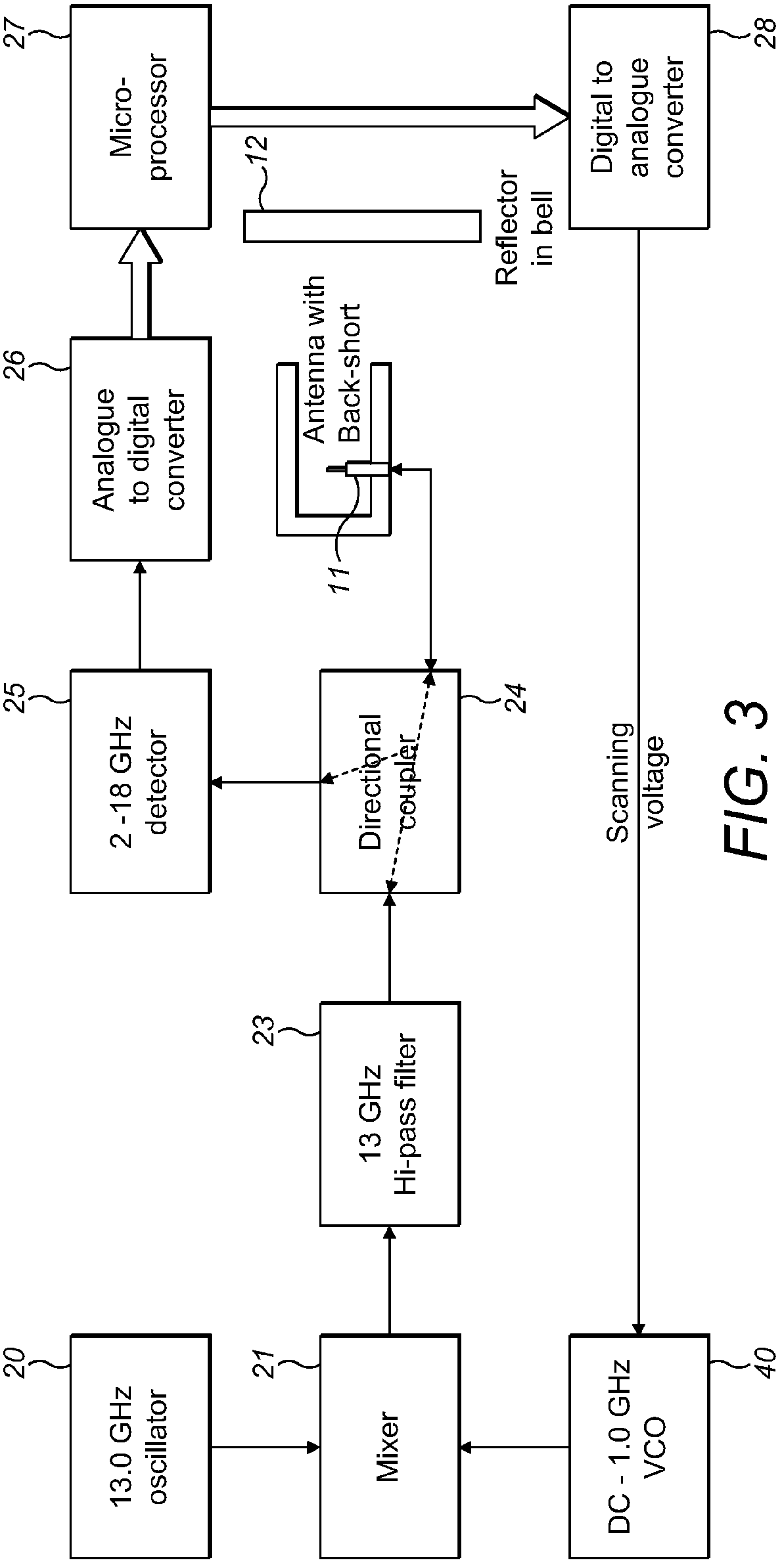
FIG. 3 is a schematic diagram illustrating an electronic processing unit of a system according to the present disclosure used with the saxophone of FIG. 1.

The stimulus waveform is generated by the system in one or both of the following ways:

1) Mixing an output signal from a local oscillator 20 with a scanning waveform from a variable frequency, voltage controlled oscillator ("VCO") 40, and filtering the output to provide a single side-band signal transmitted as shown in FIG. 3.
2) Directly digitally synthesised.

Figure 4:
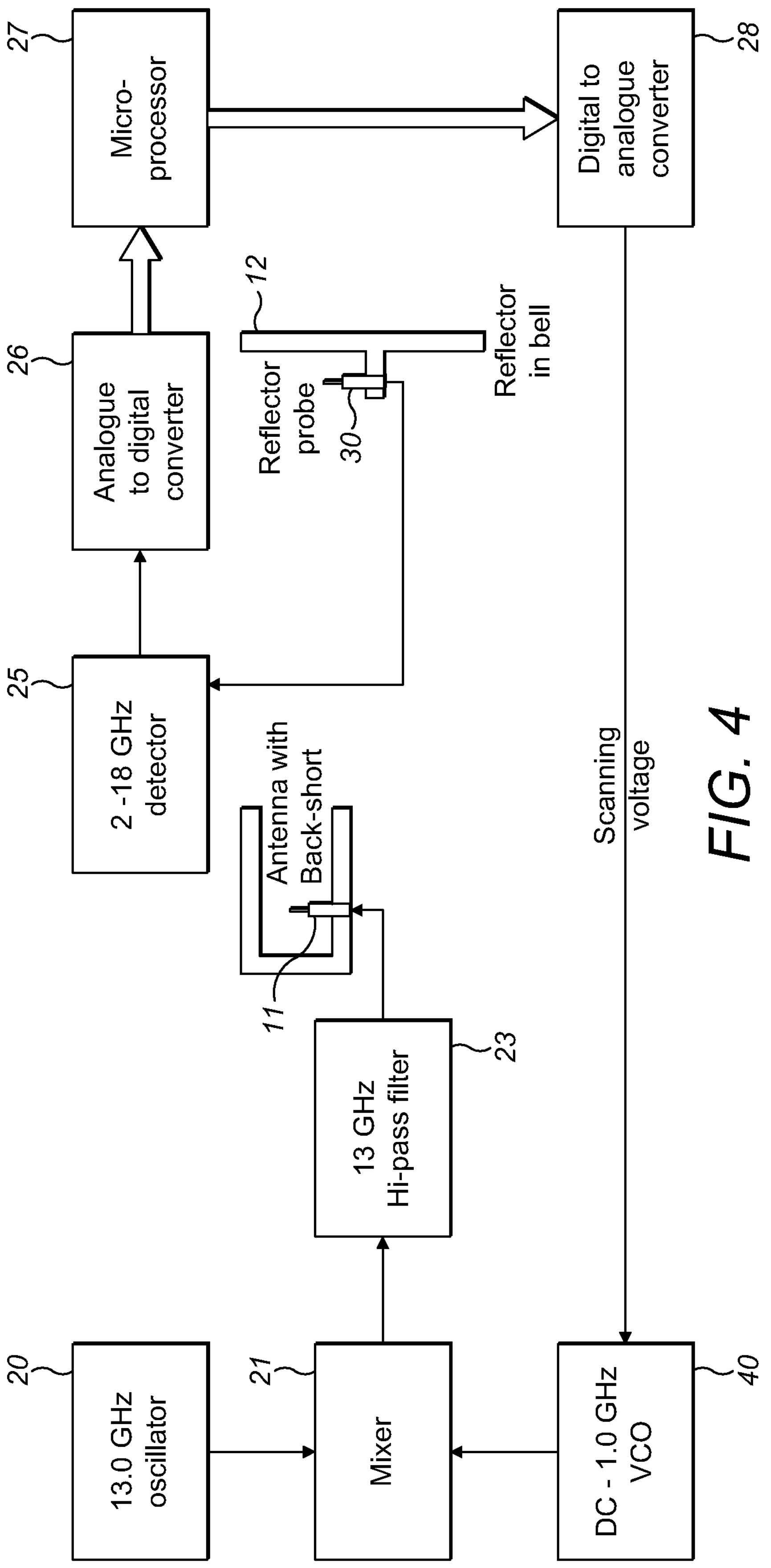
FIG. 4 is a schematic diagram illustrating an electronic processing unit of a system according to the present disclosure used with the saxophone of FIG. 2 having the reflector fitted.
Figure 5:
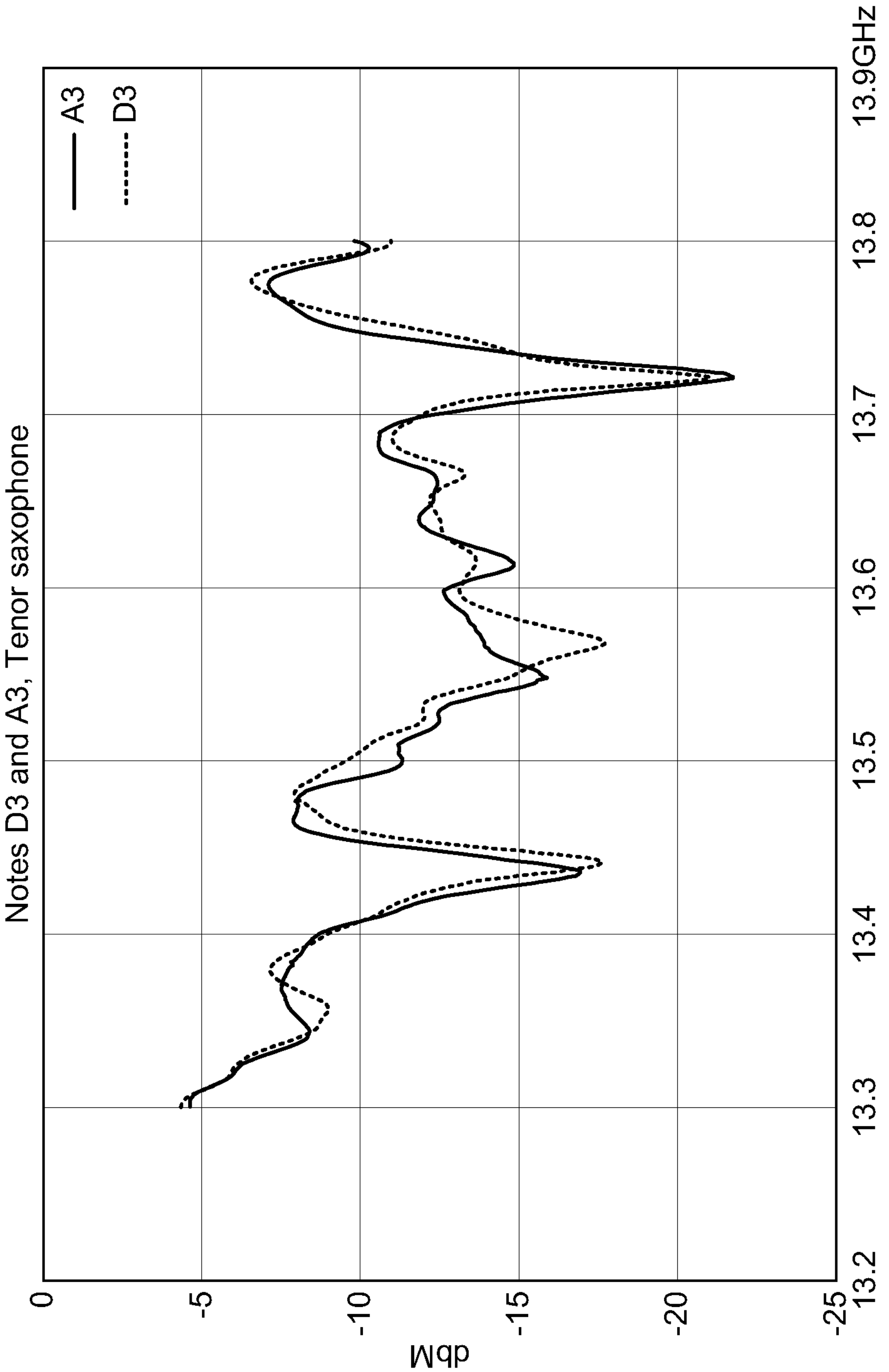
FIG. 5 is a graphical illustration of a reflected wave of 13.3-13.8 GHz magnitude response when the system of the present disclosure is used with a tenor saxophone.

There can be seen in FIGS. 3 and 4 schematic illustrations of two different embodiments of an electronic processing unit of the disclosure. Both have an oscillator 20, a VCO 40 and a mixer 21. The VCO 40 is an electronic oscillator whose oscillation frequency is controlled by a voltage input. The applied input voltage determines the output oscillation frequency. The VCO 40 receives a DC "scanning voltage" signal from a digital to analogue converter 28, which controls the output of the VCO 40. The digital to analogue converter 28 is controlled by a microprocessor 27, as will be described later. A signal output from the mixer 21 is passed through a high-pass filter 23 to provide a stimulation signal to be broadcast by the antenna 11.

Thus the transmitted stimulus waveform can resemble a classical 'chirp' waveform and either move smoothly between frequencies or be stepped. For instance, the microprocessor 27 can step the broadcast frequencies by way of a control output to the digital to analogue converter 28; the microprocessor 27 knows what frequency has just been broadcast, so it will know the next frequency to be broadcast in the series. The direct synthesis steps may be chosen linearly or exponentially depending upon the range of the scanning frequency or at spot frequencies chosen to maximise the difference responses.

When the stimulus waveform is applied to the instrument 10, being transmitted by the antenna 11, it is modified by the reflected waveform dependent upon the keyholes which are currently closed.

In FIG. 3 a representative signal from the reflected waveform is produced through a directional coupler 24 (e.g. Narda™ 4016-D, 12.4-18.0 GHz). The coupler 24 may be connected to a peak-detector diode 25 (e.g. Keysight ™ 88290-600445, 2-18 GHz) in order to provide to the microprocessor 27 a baseband signal representing the instantaneous peak of the reflected waveform. Thus the d.c. level of the peak-detector diode baseband signal is representative of the magnitude of the reflected wave as the analysis waveform is scanned. The entire circuit can advantageously be implemented in a microstrip on a printed circuit board.

Other standard microwave circuits to measure the magnitude and/or phase of the reflected wave are possible, e.g. a homodyne circulatory mixer supplied with the analysis waveform and the reflected waveform as input signals to the mixer.

In FIG. 4, a 'reflector probe' 30 (a receiving antenna) is placed adjacent to the reflector 12 at the bell end 13 of the instrument 10 in order to carry out a transmission measurement, detecting the signal within the conical cavity, as shown in FIG. 4 (in this embodiment the antenna 11 is used only to transmit the excitation signal and is not used to receive the reflected signal, only the probe 30). The signal from the reflector probe 30 can be amplified if necessary (not shown), measured with the detector 25 and processed as shown in FIG. 4, being passed through the peak-detector diode 25 through to microprocessor 27.

In both the FIG. 3 and FIG. 4 systems the signal output from the diode 25 is passed through an analogue to digital converter 26 and then the digital signal is passed to a microprocessor 27.

Further schemes are possible combining FIGS. 3 and 4 to measure the signals from both probes.

In implementing the system, there is an initial training phase in which the system operates in a training mode in which every possible outcome which it is desirable to recognise is generated and the frame of data for each outcome is acquired and stored in a memory of the microprocessor 27, e.g. being digitised by the microprocessor 27 and committed to the memory as representing the respective outcome. So, for each musical instrument there is a training phase when each note is played at least once and the magnitude spectral outcome for each note is captured by the system. Measured spectra for the notes D3 and A3 on a tenor saxophone are shown in FIG. 5 as examples.

Subsequent to the training phase, the system runs in a note recognition mode while the instrument is played normally. In the note recognition mode, live frames of data are acquired and then compared by the microprocessor 27 with those collected in the memory during training. The closest match with the training date is used to determine the 'played' note. A variety of statistical techniques may be applied to determine the closeness of the match. The signal processing and matching process can be completed typically in under 10 ms, depending upon processing power.

Once a played note has been determined by the system, the system can use a synthesizer unit of the system (not shown) to synthesize and to output the detected musical note for transmission to e.g. headphones, so the player can hear a synthesized musical note in response to a change of fingering with a typical worst-case latency of under 20 ms.

A pressure sensor (not shown) can be incorporated in the system to measure the breath pressure of the player and thereby the timing of the starting of generation of the synthesized musical notes and/or their volume can be controlled by the system with reference to a pressure signal generated by the pressure sensor, in order to provide a realistic playing experience. The pressure sensor can be incorporated in a replacement mouthpiece, integral with the end cap 15 or mountable thereon, used to replace the regular mouthpiece of the instrument. The replacement mouthpiece could have a passage directing the breath of the player of the instrument through an outlet provided in the replacement mouthpiece or a small aperture could be provided in the end cap 15 for the passage of breath and a tube could be connected to such an aperture to lead the breath through the instrument to a tube outlet at or beyond the outlet of the instrument. When the system of the disclosure is used with an Aerophone or for a Labrasone, a breath sensor could be provided or a lip vibration sensor, e.g. as described in published PCT applications WO2018/138504A1 and WO2018/138591A3, and a signal from such a breath senor or lip vibration sensor sent to the microprocessor 27 and used thereby to control the starting of generation of the synthesized musical notes and/or their volume. When a breath sensor is used e.g. with a flute, then the breath sensor can send signals to the microprocessor 27 indicating the direction and the velocity of breath and these signals can be used by the microprocessor e.g. to select the correct octave or register for the musical note to be synthesized.

The transmission and measurement of an electromagnetic wave (as opposed to the acoustic wave) has the distinct advantage that it the system is immune to acoustic interference. With suitable amplification a musical instrument fitted with the system of the disclosure may be played in a performance ensemble with other instruments or in a solo capacity.

The analysis waveform power requirement is very small, typically 0 dBm (1 mW), and is within international safety standards for electromagnetic radiation. Advantageously the whole system may be battery powered, with a battery possible being contained within the bell of the instrument. A power amplifier and loudspeaker may also be contained within the bell of the instrument for local performance. Alternatively for performance to a large audience the instrument may be linked to an off-instrument synthesiser/amplifier/speaker arrangement by means of a digital radio connection, e.g. Bluetooth™.

The synthesizer unit of the system can run a user-controllable musical synthesis algorithm to allow the player to choose synthesized signals which synthesize the musical notes of a different type of instrument, e.g. so that an experience saxophonist can play his/her saxophone yet hear musical notes output via headphones or speakers which sound like notes played on a piano.

The system has been described above in use with a saxophone, which includes metal keycaps fingered by the player to open and close the holes spaced along the resonant chamber. This is ideal for the disclosed system and method since the position of the metal keycaps will significantly affect the electromagnetic transfer function of the resonant cavity. However, there will be some change to the electromagnetic transfer function of the resonant chamber with just the player's fingers opening and closing the holes, so the system and method of the disclsoure can be used also with metal flutes and metal clarinets, which can have a mixture of rings/holes covered by the finger and metal caps. Also instruments that are traditionally wooden could be provided with a metal coating on the surface defining the resonant cavity, in order to allow use of the system and method of the disclosure. It should also be mentioned that some instruments (e.g. labrasones such as trumpets) do not have openings but rather valves changing tube lengths and others (e.g. labrasones such as trombones) have sliding elements altering the length of the resonant chambers; such changes to the resonant cavity and would be detected by the system of the disclosure, which is therefore of use with such instruments.

The invention claimed is:

1. A system for identification of a musical note played by a musical wind instrument with a resonant chamber having a plurality of configurations selectable by a player of the musical wind instrument and an electrically conductive surface in the resonant chamber, the system comprising:

a stimulation signal generator for generating a stimulation signal;

antenna means mountable on the musical instrument for broadcasting the stimulation signal as an electromagnetic signal within the resonant chamber and for receiving a reflected electromagnetic signal from the resonant chamber; and an electronic processing unit for processing the reflected electromagnetic signal and determining therefrom a configuration of the resonant chamber selected by the player and indicative of a musical note that is or would be output by the instrument when played at the time of the received reflected signal;

wherein the electronic processing unit further comprises a memory;

wherein the stimulation signal is broadcast by the antenna means in a training mode as an electromagnetic signal separately for each different fingering configuration of the instrument, each different fingering configuration being associated with a different musical note played by the instrument, and the received reflected electromagnetic signals, or signals derived therefrom by the electronic processing unit, are separately stored in the memory of the electronic processing unit.

2. A system as claimed in claim 1 wherein the broadcast stimulation signal is a radio frequency signal.

3. A system as claimed in claim 1 wherein the antenna means comprises a single antenna.

4. A system as claimed in claim 3 wherein the antenna is provided in an end cap mountable on the musical wind instrument in place of a mouthpiece of the instrument.

5. A system as claimed in claim 1 further comprising a conducting reflector mountable to the instrument across an aperture at an open end of the resonant chamber.

6. A system as claimed in claim 1 further comprising a conducting reflector mountable to the instrument across an aperture at an open end of the resonant chamber and wherein the antenna means comprises a first antenna mountable at a mouthpiece end of the musical instrument and a second antenna mounted on the conducting reflector.

7. A system as claimed in claim 1 wherein the antenna means comprises a plurality of probe antennae.

8. A system as claimed in claim 7 wherein the plurality of probe antennae are arranged around a plane orthogonal to the resonant cavity.

9. A system as claimed in claim 8 wherein the plurality of probe antennae are provided in a microstrip circuit with a plurality of orthogonal probes.

10. A system as claimed in claim 1, wherein the electronic processing unit is configured, in a musical note recognition mode, to compare the reflected electromagnetic signals received thereby, or signals derived therefrom by the electronic processing unit, with the signals stored in the memory of the electronic processing unit and determine a best match with the stored signals and from the best match determine the musical note that is or would be output by the instrument when played at the time of the received reflected signal.

11. A system as claimed in claim 1 wherein the stimulation signal generator is configured, during operation of the system, to generate a plurality of stimulation signals at spaced time intervals and wherein the electronic processing unit derives from the reflected electromagnetic signal associated with each stimulation signal a frame of data from which the derived musical note is determined.

12. A system as claimed in preceding claim 1 wherein the electronic processing unit comprises: a synthesizing unit which synthesizes a musical note signal according to which musical note has been determined from the received reflected electromagnetic signal: and an output means for outputting the synthesized musical note to a loudspeaker or to headphones.

13. A system as claimed in claim 1 wherein the stimulation signal generator is configured to generate a stimulation signal having a frequency of approximately 24 GHz.

14. A system as claimed in claim 1 wherein the antenna means is configured to generate a circularly polarised electromagnetic signal.

15. A system as claimed in claim 1 wherein the antenna means is configured to generate a linearly polarised electromagnetic signal.

* * * * *